United States Patent

Sergio

[11] Patent Number: 5,297,020
[45] Date of Patent: Mar. 22, 1994

[54] SIMPIFIED OPERATION, ELECTRONIC CONTROL PANEL FOR INDUSTRIAL SEWING MACHINES

[76] Inventor: Borile Sergio, Via Corsico, 26, 27029 Vigevano, Pavia, Italy

[21] Appl. No.: 843,504

[22] Filed: Feb. 28, 1992

[30] Foreign Application Priority Data

Mar. 1, 1991 [EP] European Pat. Off. ........ 91830069.0

[51] Int. Cl.⁵ .......................... G06F 15/46; D05B 3/02
[52] U.S. Cl. ...................................... 364/146; 364/188; 364/470
[58] Field of Search ............... 364/146, 188, 189, 470; 112/121.11, 121.12, 445, 454, 458

[56] References Cited

U.S. PATENT DOCUMENTS

| | | | |
|---|---|---|---|
| 4,275,674 | 6/1981 | Carbonato et al. | 112/457 |
| 4,688,503 | 8/1987 | Kato | 112/445 |
| 4,860,678 | 8/1989 | Skogward | 112/445 |
| 4,892,050 | 1/1990 | Ando et al. | 112/458 |
| 4,942,836 | 7/1990 | Sano et al. | 112/445 |
| 4,943,906 | 7/1990 | Tajima et al. | 364/188 |
| 4,960,061 | 10/1990 | Tajima et al. | 112/445 |
| 5,044,291 | 9/1991 | Kobayashi et al. | 112/445 |
| 5,048,439 | 9/1991 | Tschopp et al. | 112/458 |
| 5,099,777 | 3/1992 | Mori | 112/445 |

FOREIGN PATENT DOCUMENTS 2214660 9/1989 United Kingdom .

*Primary Examiner*—Jerry Smith
*Assistant Examiner*—Paul Gordon
*Attorney, Agent, or Firm*—Robert Charles Beam

[57] ABSTRACT

A simplified operation control panel for industrial sewing machines powered by an electric motor controlled through a programmable microprocessor is configured as a structurally independent unit and comprises a display, and at least a pair of control keys, each adapted for activating in quick succession the displaying of graphic symbols related to sewing program steps.

12 Claims, 6 Drawing Sheets

SIMPIFIED OPERATION, ELECTRONIC CONTROL PANEL FOR INDUSTRIAL SEWING MACHINES

TECHNICAL FIELD

This invention relates to an electronic control panel with simplified operation features for industrial sewing machines powered by an electric motor controlled through a programmable microprocessor.

BACKGROUND OF THE INVENTION

As is known, in the specific technical field to which this invention is related, there exists a growing demand for sewing machines which be extremely flexible as concerns their operation.

This demand has been met in part by the availability of direct current electric motors controlled through a programmable microprocessor. In fact, the use of such motors on industrial sewing machines has enabled the use of their associated microprocessor for storing and subsequently carrying out varying types of sewing programs in an automatic fashion. Each program comprises pre-selected sequels of sewing steps to be carried out with great accuracy.

While being advantageous from several aspects, and basically achieving their objectives, prior art sewing machines have, however, some limitations arising from their practical inability to follow any types of sewing programs, or in other words, any sequel of sewing steps possibly wanted by their users.

It should be noted that this practical inability is more due to the prior art failure to provide the user with control panels for the microprocessor which could allow said sewing programs to be changed as desired, than to the size of the program memory associated with the microprocessor, which can be easily expanded as required to accommodate a larger number of sewing programs. In fact, the prior art currently proposes as a solution that sewing machines be equipped with control panels including an alphanumeric display and a control keyboard effective to enable the values to be changed of various operational parameters related to the sewing programs.

These conventional control panels have shown to be only usable by highly qualified personnel familiar with every detail of the nature of the various sewing programs. In fact, alteration of just one program step would involve the entry and/or change of certain alphanumeric codes, available from the handbook of the machine, but not to be arrived at intuitively by ordinary users of the machine.

In addition, the complicated structure of the control panel imposes a training work on the user which is often inconsistent with his/her professional qualifications.

SUMMARY OF THE INVENTION

The underlying technical problem of this invention is to provide an electronic control panel for industrial sewing machine, which has such structural and functional features as to permit of a specially simplified utilization of the machine functions, while providing the faculty to modify at will the sequel of operational steps which make up each sewing program.

Another object of this invention is to provide a control panel which can interact with any of the known sewing machines on the market.

The technical problem is solved by a control panel as indicated being characterised in that it comprises a display, at least a pair of selector keys, and electronic means for displaying, in succession on the display, graphic symbols which are related and correspond to steps of the microprocessor sewing programs, said keys giving access to such programs for the visual selection and modification of said symbols and the corresponding program steps.

The features and advantages of a control panel according to the invention will become apparent from the following detailed description of an embodiment thereof, given by way of illustration and not of limitation with reference to the accompanying drawings.

DETAILED DESCRIPTION OF THE PREFERRED EMBODIMENTS

Figure 1:
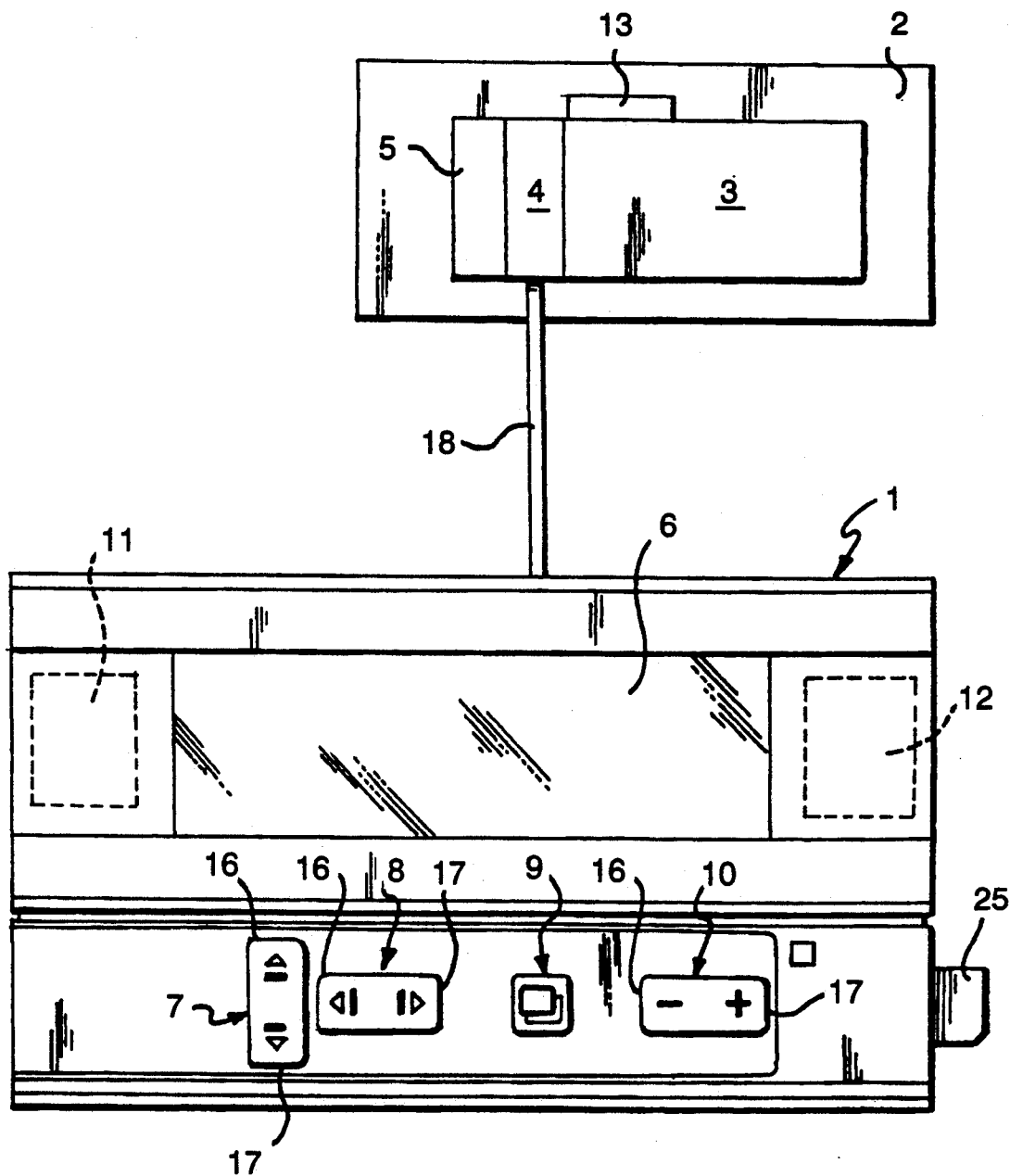
FIG. 1 is a general view showing the control panel of this invention and a sewing machine incorporating it.
Figure 2:
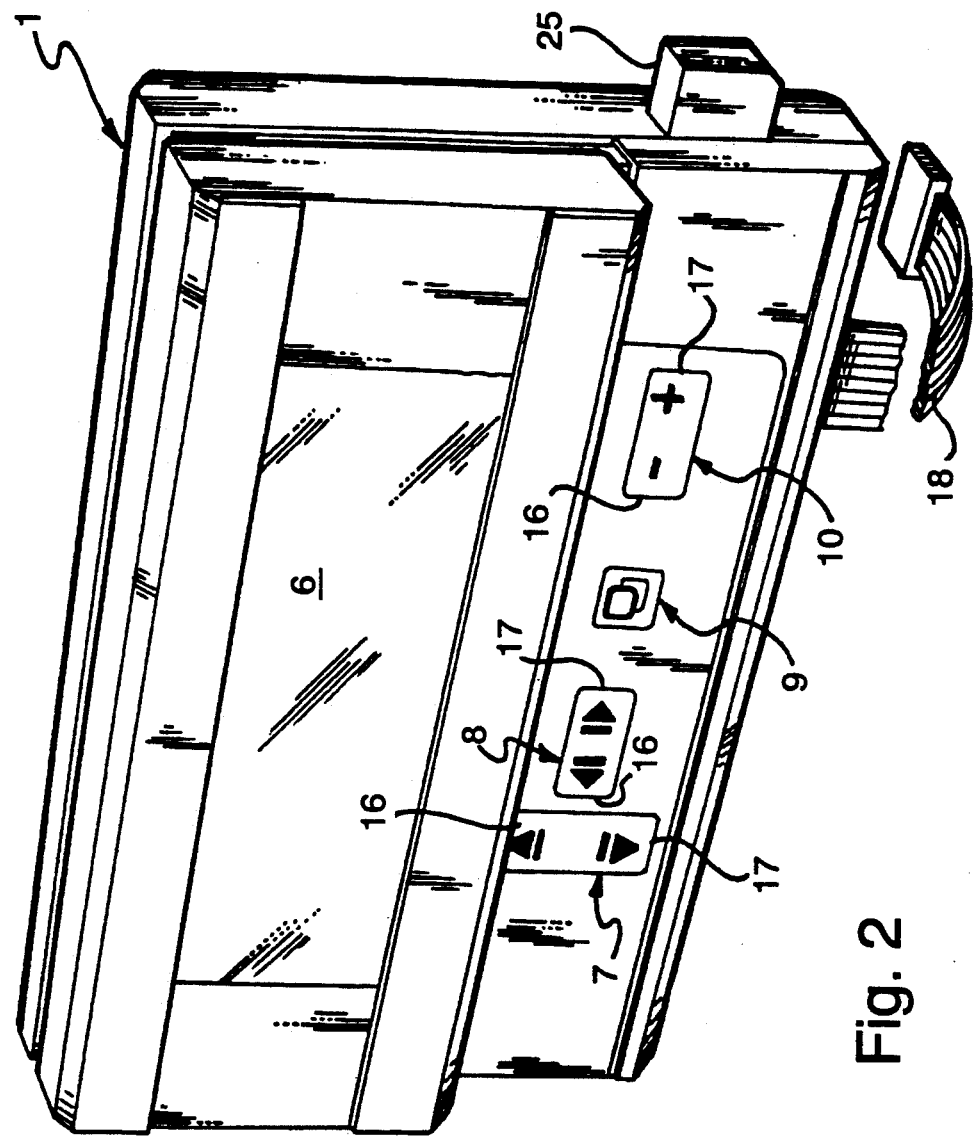
FIG. 2 is a perspective view of just the control panel.

With reference to the drawing views, shown at 1 is an electronic control panel with simplified operation features intended, according to the invention, for use on industrial sewing machines, such as shown schematically at 2.

The sewing machines would be equipped with, and driven by, a permanent magnet, DC electric motor 3 of the so-called brushless type.

The motor 3 is preferably powered on a single phase and controlled through a programmable microprocessor 4 which is obviously accommodated on and powered through an electronic card equipping the machine along with its data and program memories 5, e.g. of the RAM and EPROM types.

The motor 3, under control by the microprocessor 4, is adapted to drive the sewing machine by gradual control of its speed and while ensuring accurate implementation of pre-selected sewing programs.

Advantageously, the program memories associated with the microprocessor contain algorithms which are suitably matched to all the different types of sewing machines known on the market, and accordingly, the electronically controlled motor would automatically afford performance of any type of stitch on any type of sewing machine.

In essence, it becomes possible to program and perform selected sewing steps on each type of sewing machine, be it for knot stitching, chain stitching, zigzag stitching, cut-and-sew stitching, invisible stitching, sewing with twin disengageable needles, etc.

The machine 2 is also equipped with a synchronizer 13 which allows the microprocessor 4 to constantly receive an electric signal corresponding to the operational setting of the machine.

Advantageously, according to the invention, the control panel 1 enables the user to monitor the proper operation of the machine and to change the type and implementation of the various sewing programs available.

For this purpose, the control panel 1 includes a display 6, e.g. of the liquid crystal type, and four control keys, indicated at 7, 8, 9 and 10, the peculiar functions of which will be described hereinafter.

The control panel 1 comprises internally a pair of so-called interfaces 11 and 12 for bi-directional transmission of data and control signals to and from the microprocessor 4.

Provided for the purpose is an electric parallel connection 18 of the ribbon type which extends between the control panel 1 and the card carrying the microprocessor 4. This connection consists of a series of the so-called data and control buses having opposed ends terminated with connectors of the quick-connect type, known per se.

The control panel 1 is structured as an independent detachable unit within a parallelepipedic case adapted to be positioned on an upright of the sewing machine with the display facing toward the user.

The keys 7-10 are selector keys, and whereas the key 9 is essentially of the pushbutton type, the remaining keys 7,8 and 10 are of the bi-univocal actuation type in that they allow their opposed ends 16 and 17 to be keyed in to either increase, decrease, or in any way select a predetermined entry of a seam program.

For the sake of a simplified illustration, throughout the following discussion, the key 7 will be referred to as the vertical selection slider; the key 8, as the horizontal selection slider; the key 9 as the three-dimensional slider; and the key 10 as the programming key.

The various keys are arranged to act, through the interface 11, on the several sewing or seam programs of the microprocessor 4, while also providing a graphic representation on the display 6 of the programs themselves. The control panel 1, in fact, is set up to enable the user to call from the program memories the various algorithms defining the sequels of sewing steps to be carried out on the machine. Such algorithms, however, are presented to the user, on the display 6, in graphic forms by assigning and relating a predetermined graphic symbol 14 to each step of the sewing program.

Each graphic symbol is contained within a rectangular block 15, and adjacent blocks represent the type and sequence of the corresponding sewing program steps.

Figure 3:
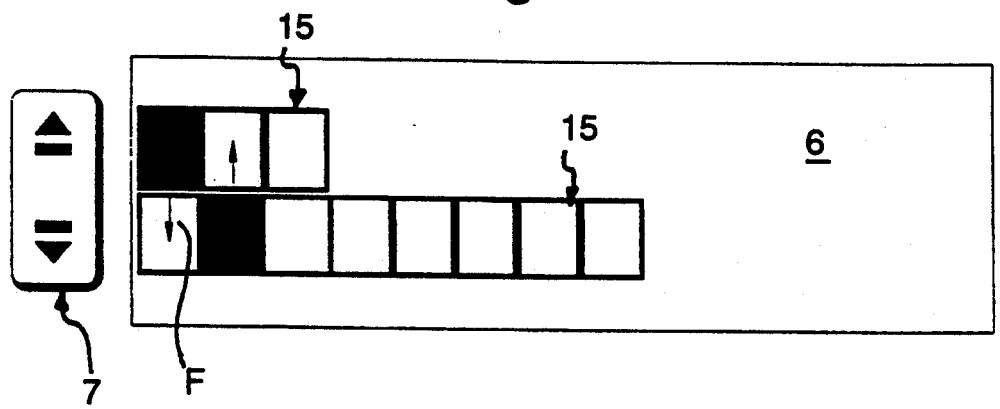
FIGS. 3, 3A, 4, 5 and 6 are respective views showing schematically a display incorporated to the control panel in FIG. 1, under different operating conditions thereof.
Figure 3A:
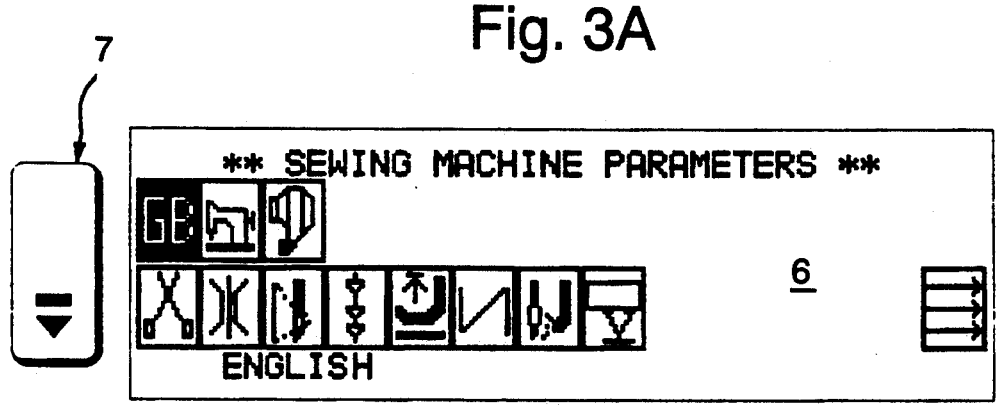

By way of illustration, reference may be had to the examples of FIGS. 3 and following. FIGS. 3 and 3a show schematically the possibilities afforded by the vertical slider 7, which allows the user to select the various blocks 15 in the vertical direction as indicated by the arrow F.

Figure 4:
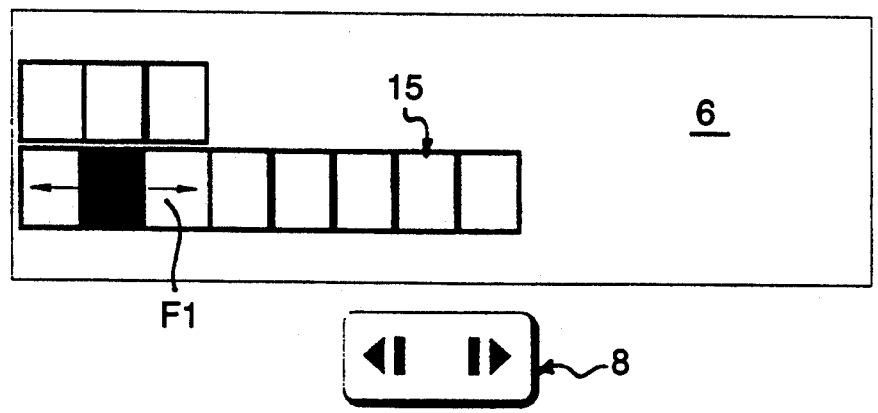

Likewise, FIG. 4 shows an example of how the horizontal slider 8 can be used to select the blocks 15 in the direction of the arrow F1.

Figure 5:
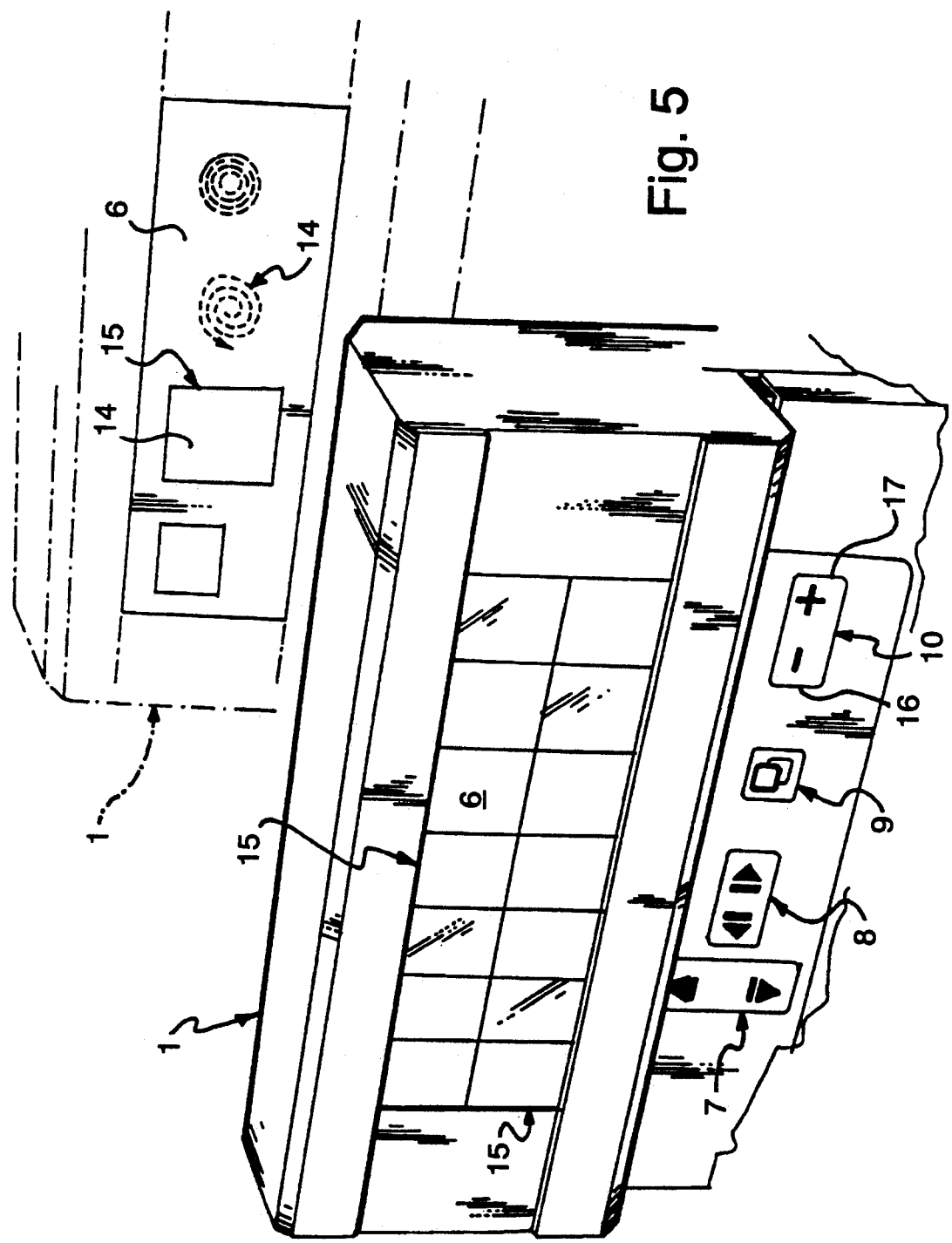

The three-dimensional slider 9 can be used, on the other hand, to display modifiable parameters pertaining to a definite block 15, previously selected by means of the sliders 7,8. This slider 9 affords display of a further series of graphic symbols and/or operational parameters related to a given function of the machine 2; illustratively, it is as if this slider 9 were operative on an orthogonal axis to that of each of the previous sliders 7 and 8, as shown in FIG. 5.

Figure 7:
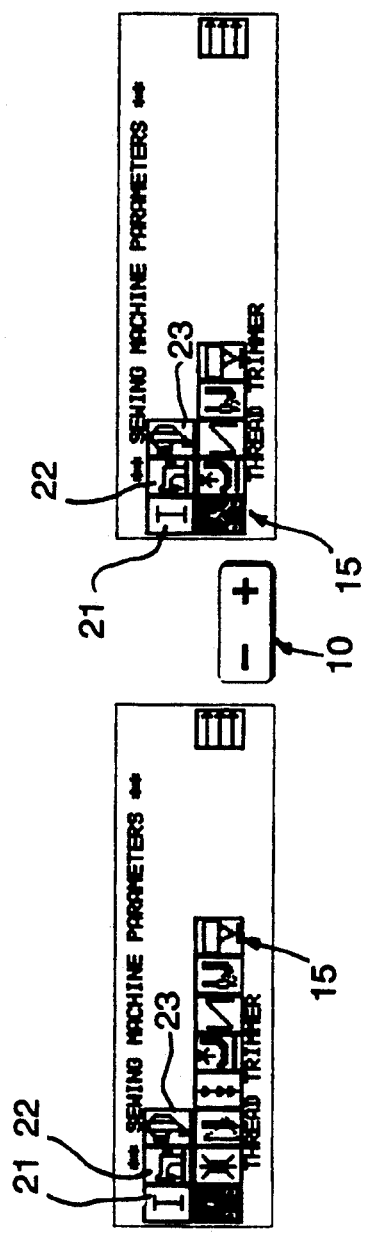
FIGS. 7, 8, 9, 10 and 11 are further schematic views of the display under different conditions of its operation.
Figure 8:
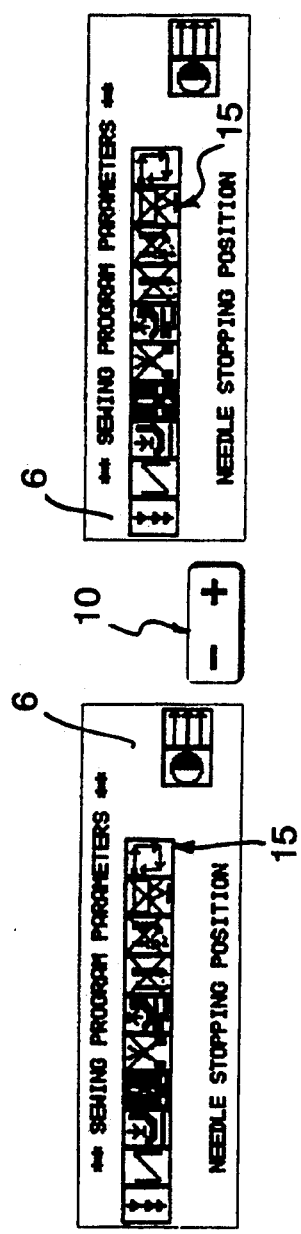
Figure 9:
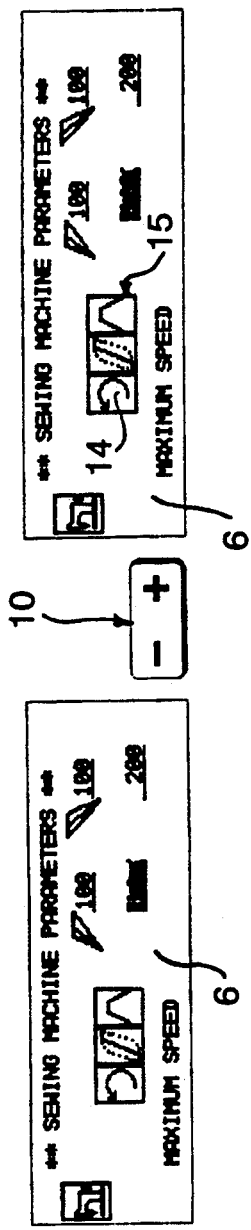

Each time that a block 15 or a series of graphic symbols and/or related parameters are selected, by means of the programming key 10, the function brought out can be either confirmed or cancelled, a function type can be changed, or the value of a given parameter be increased or decreased. FIGS. 7, 8 and 9 show schematically the appearance of the display 6 under such operational conditions.

The operational procedures for programming the sewing machine 2 will be now described as are made practicable by the control panel of this invention. A starting condition is assumed whereby the motor 3 has been mounted to the machine and the synchronizer 13 connected.

The control panel 1 allows interaction with the microprocessor 4 by calling or changing the contents of the program memories 5 associated therewith. Access to the microprocessor 4 is enabled at three different operational levels.

A first level gives access to the program for the machine operating parameters, whilst a second level allows the seam programs to be entered. A third level concerns then the use of the sewing machine itself.

In general, the first access level is afforded, through an input code, to a technician for setting the operating parameters of the machine.

In this operating mode, there will be displayed on the display 6 a first layout of cells 15 containing various graphic symbols, each related to certain given operating parameters of the machine 2.

By manipulating the vertical slider 7 and/or the horizontal slider 8, any of such cells can be selected, and therefore, the values of the parameters tied to it can be displayed or changed. A first cell 21 enables selection, for example, of a language in which one wish to work; a second cell 22, on the other handallows the type of the machine at work to be selected. A successive cell 23 identifies the synchronizer associated with the motor 3, and the other cells are related to other functional parameters.

For instance, it becomes possible to alter the acceleration/speed curves of the motor; record the stop position of the needle; activate the thread shaving and thread discarding functions; operate the automatic shoe-raising mechanism where provided in the machine; effect the tension disk opening; set the needle stop position; call for a slow start after a cut has been made; program the so-called starting and/or final release; and to adjust other parameters.

As mentioned, the second access level allows storage, and possible change, of the sewing programs to be implemented on the machine 2.

Available from the memories 5 are fifty programs, each including at least fifteen seam segments, additionally to the starting and final releases. Also, up to 5000 stitches can be stored per segment.

There are two ways of storing the programs: by self-teaching or by keying.

In the former instance, in performing a seam, the number of stitches and the operating conditions of the various machine devices would be stored automatically.

In the latter instance, on the other hand, it is through the keys themselves of the control panel 1 that there are entered all the seam parameters, the number of the segments, the number of the stitches per segment, and the implementation rate. Any required changes would be effected by displaying the graphic symbols related to the various seam segments, as shown in FIG. 6.

Figure 10:
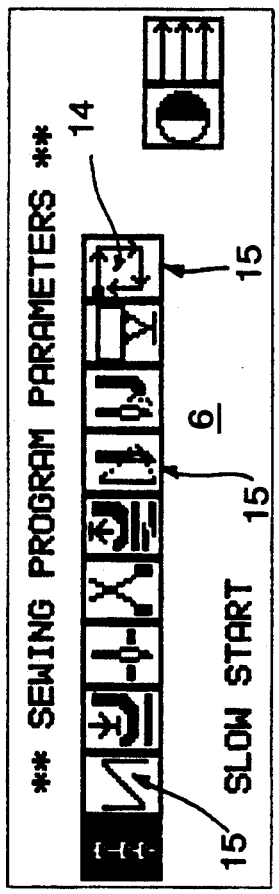

For example, by depressing the end 17 of the vertical slider 7, the access level would be displayed which makes available to the user, for a given sewing program, those apparatus and functions which have been previously arranged for at the machine programming stage, as shown in FIG. 10.

Thus, the user can change the configuration through the programming key 10 and, of course, after selecting through the sliders 7 and 8 the graphic symbol which corresponds to the function of interest.

Figure 6:
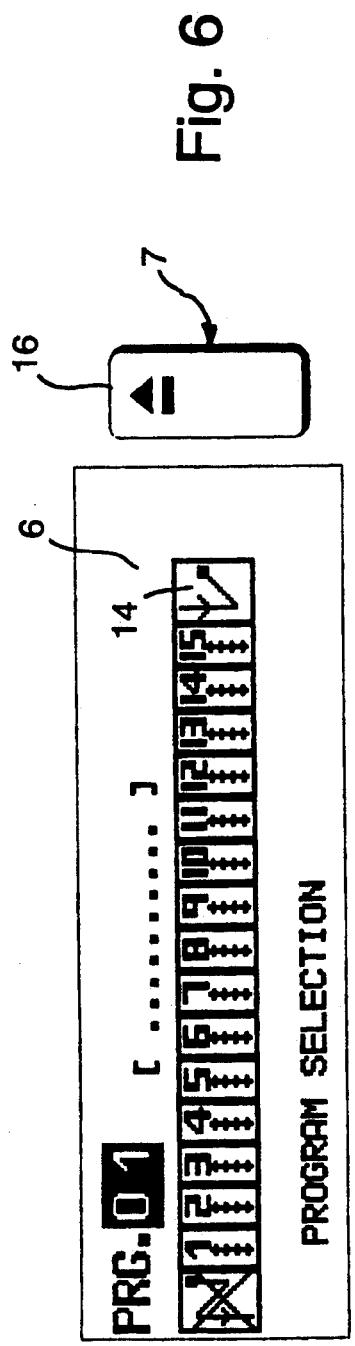
Figure 11:
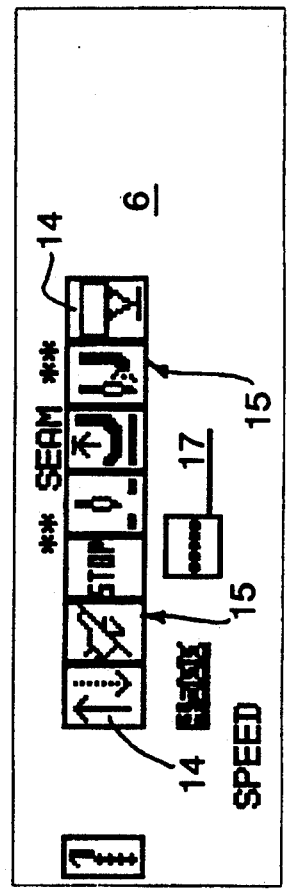

By shifting then the sliders through the sequel of 5 blocks shown in FIG. 6, which are indicative of the seam segments, the key 9 can be depressed for each segment to set: the implementation rate, number of stitches, position of the needle or the shoe after the stop, and several other parameters, as shown in FIG. 11.

Each program may be coded and then appear on the display with its own reference code.

It being possible to tie a seam segment to the next on a continuous basis, and to program different implementation rates for each segment, it becomes much easier to guide the workpiece through the most difficult sections for the operator, e.g. around bends.

Advantageously, the sewing programs, as well as the program information about the operation of the devices provided in the machine 2, may be transferred to an external memory for storing in other machines.

This is made possible by an external storage unit 25 inserted detachably in the control panel 1.

It may be appreciated from the foregoing description that the control panel of this invention will enable an operator of the sewing machine to make full use, in a particularly simple and effective manner, of the features of the various machine devices. This reflects in an ability to perform sewing operations at an optimum speed, by suppression of the time devoted to controlling the device actuation, thereby enabling the operator to devote his/her full attention to the guiding of the workpiece.

The net outcome of this is a significant increase in productivity.

I claim:

1. A control panel for an industrial sewing machine, said sewing machine comprising at least in part, an electric motor controlled through a microprocessor, and a control panel comprising a visual display and keys for programming said microprocessor and controlling said sewing machine,
    wherein the improvement comprises:
    a) a visual display comprising electronic means including an array of horizontal rows and vertical columns containing means for the display of graphic symbols and sewing operational parameters, which graphic symbols and operational parameters are related to microprocessor programs controlling the sewing operation of said sewing machine; and,
    b) keys for programming and controlling said sewing machine, said keys consisting essentially of:
        i) a first key means for scrolling through additional graphic symbols and operational parameters;
        ii) a second key means for selecting a position within a horizontal row of said visual display;
        iii) a third key means for selecting a position within a vertical column of said visual display; and,
        iv) a fourth key means for enabling, disabling, or changing the function corresponding to the selected graphic symbol, or for increasing or decreasing the selected operational parameter.

2. The control panel of claim 1, wherein said second key means is a bi-univocal operation key adapted for keying through the opposed ends thereof.

3. The control panel of claim 1, wherein said third key means is a bi-univocal operation key adapted for keying through the opposed ends thereof.

4. The control panel of claim 1, wherein said graphic symbols are presented on said visual display within adjacent blocks.

5. The control panel of claim 4, wherein said second key means is a slider for selecting within said blocks horizontally.

6. The control panel of claim 4, wherein said third key means is a slider for selecting within said blocks vertically.

7. The control panel of claim 1, wherein said electronic means are interfaces for bi-directional transmission of data and control signals to and from the microprocessor.

8. The control panel of claim 1, wherein said control panel is structured as an independent unit detachable from said machine.

9. The control panel of claim 1, wherein said visual display is of the liquid crystal type.

10. The control panel of claim 1, further comprising a pushbutton for activating the display of operational parameters associated with each graphic symbol, and an additional bi-univocal operation key for increasing or decreasing the values of such parameters.

11. The control panel of claim 1 wherein said first key means is a push button for activating the display of operational parameters associated with each graphic symbol.

12. The control panel of claim 1 wherein said fourth key means is a bi-univocal operation key adapted for keying through the opposed ends thereof for increasing or decreasing the value of the selected operational parameter.

* * * * *